United States Patent [19]

Iwatsuka et al.

[11] Patent Number: 4,915,833

[45] Date of Patent: Apr. 10, 1990

[54] COLUMN FILTER USING BUNDLES OF LONG FIBERS

[75] Inventors: Takeshi Iwatsuka, Tokyo; Toshio Kasai, Saitam, both of Japan

[73] Assignee: Japan Organo Co., Ltd., Tokyo, Japan

[21] Appl. No.: 380,801

[22] Filed: Jul. 14, 1989

Related U.S. Application Data

[62] Division of Ser. No. 357,321, May 25, 1989, Pat. No. 4,886,601.

[30] Foreign Application Priority Data

May 31, 1988 [JP] Japan .................................. 63-131715
Nov. 30, 1988 [JP] Japan .................................. 63-300980

[51] Int. Cl.⁴ ...................... B01D 13/00; B01D 13/01
[52] U.S. Cl. ............................. 210/321.67; 210/321.69
[58] Field of Search ........... 210/321.6, 321.64, 321.67, 210/321.72, 321.69, 321.78, 321.79, 321.8, 321.87, 321.88, 321.89

[56] References Cited

U.S. PATENT DOCUMENTS 4,605,500  8/1986  Takemura et al. ............. 210/321.78

Primary Examiner—Frank Sever
Attorney, Agent, or Firm—Flynn, Thiel, Boutell & Tanis

[57] ABSTRACT

A column filter using bundles of long fibers is disclosed. The bundles of long fibers are fixed at their lower end portions but are free-standing at their upper end portions. The length of the fibers in the bundles may preferably be longer than 1,000 mm but shorter than 3,000 mm—especially longer than 2,000 mm but shorter than 3,000 mm. During operation, the bundles may be compressed to a height of 80-30%, generally 50-40% of their original height. A plurality of holders for the respective bundles of long fibers, each of said holders being formed of a cap and a tube communicating to each other, said cap defining orifices and said tube defining a slot through a side wall and opening at both upper and lower ends, may preferably be provided on a perforated plate arranged transversely in a lower interior part of the shell with the cap being located above the perforated plate and the tube being positioned below the perforated plate. The holders cover substantially all perforations of the perforated plate. The lower end portion of each of the bundles is fixed to a lower periphery of a side wall of the associated cap.

15 Claims, 4 Drawing Sheets

COLUMN FILTER USING BUNDLES OF LONG FIBERS

This is a division of Ser. No. 357,321, filed May 25, 1989, now U.S. Pat. No. 4,886,601, issued Dec. 12, 1989.

BACKGROUND OF THE INVENTION (a) Field of the Invention

This invention relates to a column filter which uses bundles of long fibers as a filter medium to remove at a high rate suspended solids from raw liquids such as city water, industrial water, sewage, river water, lake or pond water, supernatant waters from coagulation and settling treatments, waters discharged intermediately during the practice of various processes, recovered waters such as those from pulp-and paper-making processes, various waste waters, processing waters or valuable-material-containing liquids from biological treatment apparatus, alcoholic beverages, oils and the like. In particular, this invention is concerned with a column filter of the above sort, in which an improvement has been applied to the structure holding lower end portions of the bundles of long fibers.

(b) Description of the Related Art

A variety of filters have conventionally been used to remove suspended solids from a raw liquid.

They may be classified into several different types, including filters adapted for the removal of relatively large suspended solids from a raw liquid by a screen such as a wire mesh, filters employed for the microfiltration of fine particles from a raw liquid by a filter membrane having micropores, and filters using filter elements, which carry a precoat layer of a filter aid coated thereon, for the removal of suspended solids.

Various filters are thus used depending on the kinds of raw liquids and the purposes of their filtration. Among these, filters of the packed medium type are most common.

A typical packed medium filter has a cylindrical upright shell with a packed layer of a granular filter medium such as filter sand or anthracite or a fibrous filter medium such as short fibers or fiber balls. A raw liquid is passed as a downflow or upflow through the packed medium layer so that solids suspended in the raw liquid may be trapped in the packed layer to obtain a filtered liquid, namely, filtrate. Filtration is stopped when the pressure drop has increased to a predetermined level or the quality of the filtered liquid has fallen to a prescribed level. The packed medium layer is then flushed with water or expanded or agitated by a water stream, and air or the like, so that the solids thus trapped may be flushed away to permit resumption of the filtration through the packed medium layer thus flushed.

With packed medium filters it is desired that in the filtration step the pressure drop due to the filter medium resistance does not increase substantially and that the quality of the filtered liquid remains good even when filtration is at a high flow rate; and that in the washing step the solids trapped in the packed medium layer can be flushed completely with a minimum of both water and time.

A filter using a conventional granular filter medium such as sand or anthracite is however accompanied by drawbacks—feed velocity of the liquid through the filter medium can be as low as 20 m/hr even at the maximum, and, depending on the kind of the suspended solids, the filter medium is prone to prematured clogging and results in an increased pressure drop at a relatively early stage. During washing, this filter develops further drawbacks—washing must be at a flow rate slow enough to prevent the granular filter medium from flowing out of the shell, and the washing thus tends to be insufficient to prevent the gradual accumulation of suspended solids and, in some instances, the formation of mud balls or the like may result. There are still further drawbacks in that a relatively large quantity of washing water is required and the level of concentration of suspended solids in the effluent of washing is small.

A filter using a medium such as short fibers or fibrous balls allows free choice in size of the filter medium. It thus has an advantage that an optimal filter medium can be chosen depending on the kind of solids suspended in a raw liquid. Because the filter medium used has an extremely light weight, the filter is accompanied by drawbacks; for example, a screen or the like must be provided to prevent the filter medium from flowing out of the shell during the washing, the structure of the filter tends to become complex, and the screen becomes an obstacle to hamper the removal of trapped solids from the shell during washing, so that the washing cannot be effected sufficiently, resulting in the gradual accumulation of trapped solids.

A high rate filter—which solves the above-described drawbacks of conventional packed medium filters, permits filtration at a high rate without any substantial increase in the pressure drop by filtration resistance, and can be washed completely with a small quantity of washing water in a short time, by using a filter with bundles of long fibers—has already been proposed by the present inventors in Japanese Patent Application No. 146989/1987.

The above-proposed high rate filter has a support provided transversely or packed within a shell and bundles of long fibers 400–1,000 mm long fixed at lower end portions thereof on an upper part of the support and free-standing at upper end portions thereof, whereby a filter medium is formed. A raw liquid is passed as a downflow from the upper end portions of the fibers toward the lower end portions thereof, so that suspended solids may be trapped in interstitial spaces among the long fibers.

The use of a bundled long fiber filter has various advantages unavailable from the use of filters packed with conventional filter sand or anthracite; for example, a high filtration rate, pressure drop does not increase to any substantial extent, and complete washing is possible with a smaller quantity of wash water and in a shorter time. However, the filter has the problem that the operable filtration time is rather short, which is not satisfactory.

SUMMARY OF THE INVENTION

An object of this invention is to solve the above-described drawbacks of the filter proposed previously, which uses bundles of long fibers as a filter medium, and hence to provide a column filter featuring a longer operable filtration time while retaining the advantages of the filter proposed previously.

Another object of this invention is to provide a column filter capable of exhibiting the advantages of bundles of long fibers to a maximum extent, so that the bundles of long fibers can be washed thoroughly by backwashing and leakage of suspended solids into a filtered liquid can be minimized.

In one aspect of this invention, there is thus provided a column filter using bundles of long fibers. The filter is provided with an upright cylindrical shell and the bundles of long fibers (3) being arranged substantially upright inside the shell with lower end portions thereof being fixed and upper end portions thereof being free-standing, whereby, when a raw liquid with suspended solids therein is fed to a top part of the shell and is then allowed to pass from the upper end portions of the bundles of long fibers toward their lower end portions, the suspended solids are at least partly trapped in interstices among the fibers. A supporting member is arranged transversely in a lower interior part of the shell, the bundles of long fibers have a length in a range longer than 1,000 mm but shorter than 3,000 mm and are fixed at the lower end portions thereof on an upper surface of said supporting member. The packing density of the bundles is in a range such that the bundles may retain 30–80% of the original height thereof while the raw liquid with suspended solids is being fed into the shell and compressing the bundles toward the supporting member. The packing density of the bundles may preferably be in a range of 25–110 kg in terms of their dry weight per bulk volume m$^3$ of the bundles. The fibers in the bundles may preferably have a diameter up to 80 μm.

In another aspect of this invention, there is also provided a column filter using bundles of long fibers. The filter is provided with an upright cylindrical shell and the bundles of long fibers being arranged substantially upright inside the shell with lower end portions thereof being fixed and upper end portions thereof being free-standing, whereby, when a raw liquid with suspended solids therein is fed to a top part of the shell and is then allowed to pass from the upper end portions of the bundles of long fibers toward their lower end portions, the suspended solids are at least partly trapped in interstices among the fibers. A plurality of holders for the respective bundles of long fiber, each of said holders being formed of an upper cap member and a lower hollow member communicating to each other, said upper cap member defining openings therethrough and said lower hollow member defining an axially-elongated opening through a side wall thereof and opening at both upper and lower ends thereof, are provided on a perforated plate arranged transversely in a lower interior part of the shell with the upper cap member being located above he perforated plate and the lower hollow member being positioned below the perforated plate. The holders cover substantially all perforations of the perforated plate. The lower end portion of each of the bundles of long fibers is fixed to a lower periphery of a side wall of the associated upper cap member. The length of the long fiber bundles may preferably be longer than 1,000 mm but shorter than 3,000 mm—especially longer than 2,000 mm but shorter than 3,000 mm.

As the shape of each upper cap member, a cylindrical, polygonally-cylindrical, truncated conical, polygonally-conical truncated or hemispherical shape may be chosen suitably. Similarly, the lower hollow member may be formed into a cylindrical, polygonally-cylindrical, truncated conical, polygonally-conical truncated or hemispherical shape as desired.

The fixing of the lower end portions of the bundles of long fibers can be effected, for example, by pinching the lower end portions, adhering the lower end portions, or fusion-bonding the lower end portions themselves.

In the column filter according to this invention, the bundles of long fibers are not merely provided at the individual perforations of the perforated plate. The plurality of holders for the respective bundles of long fibers, each of said holders being formed of the upper cap member and the lower hollow member communicating to each other, said upper cap member defining the openings therethrough and said lower hollow member defining the axially-elongated opening through the side wall thereof and opening at both upper and lower ends thereof, are provided on the perforated plate arranged transversely in the lower part of the shell with the upper cap member being located above the perforated plate and the lower hollow member being positioned below the perforated plate. The holders cover substantially all perforations of the perforated plate. The lower end portion of each of bundles of long fibers is fixed to the lower periphery of the side wall of the associated upper cap member. The openings of each upper cap member are therefore surrounded substantially by the associated bundles of long fibers. Suspended solids are hence hardly allowed to leak into a filtered liquid. Upon backwashing, a fluid such as compressed air or back-washing water is allowed to flow out evenly through the individual openings of each upper cap member, so that dense parts of the bundles of long fibers, said parts being located in the proximity of the perforated plate, can be effectively washed to ensure sufficient backwashing.

The column filter according to this invention allows to perform backwashing with backwashing water and/or compressed air of a high flow velocity in a short time. Compared to the conventional filters, the backwashing time can be shortened significantly and trapped solids can be surely discharged from the shell by backwashing. Different from the conventional filters, the column filter according to this invention is free from the accumulation of trapped solids and requires backwashing water in a far smaller quantity.

Further, the column filter according to this invention allows to increase the flow velocity to a considerable extent compared to the conventional filters. It is hence possible to reduce the cross-sectional area of the column filter. This obviously leads to a considerable reduction in installation cost and space.

BRIEF DESCRIPTION OF THE DRAWINGS

FIGS. 1 through 3 illustrate a column filter according to a first embodiment of this invention, in which:

DETAILED DESCRIPTION OF THE INVENTION

Taking water with solids suspended therein as an exemplary raw liquid, the present invention will hereinafter be described in detail with reference to the drawings.

Figure 1:
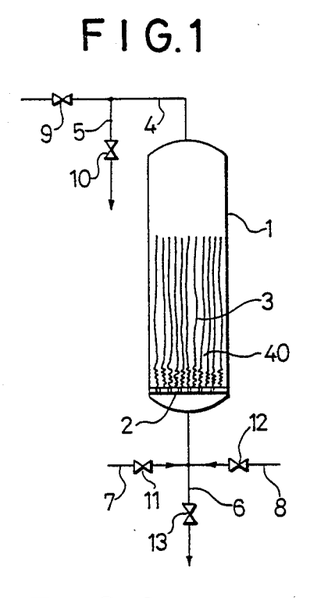
FIG. 1 is a simplified vertical cross-section of the column filter in an initial stage of filtration.

Referring first to FIG. 1, a perforated plate 2 is arranged transversely in a lower interior part of an upright cylindrical shell 1. Bundles of fibers 3, which are longer than 1,000 mm but shorter than 3,000 mm, are fixed at lower end portions thereof on the plate 2, while their upper end portions are free standing. A raw water feed line 4 is provided in communication with a top part of the shell 1 and a backwash water discharge line 5 is connected as a branch to the raw water feed line 4.

Further, a filtered water outlet line 6 is provided in communication with a bottom part of the shell 1. Backwash water feed line 7 and air feed line 8 are also provided as branches in communication with the outlet line 6. Designated at numerals 9, 10, 11, 12 and 13 are valves.

Preferably, the bundles of long fibers 3 are packed in such a quantity that even when a raw water is passed as a downflow at a relatively high flow rate, the bundled long fibers 3 may be slightly bent and compressed to a height from 80% to 30% of their original height. However, the bundled long fibers 3 should not be bent horizontally by the stream of the raw water and should remain substantially upright as a whole inside the shell 1. In other words, the height reduction of the bundled long fibers 3 ranges from 20% to 70%, generally about 40–50% while the raw liquid with suspended solids is being fed. This packing quantity can provide a filter member having an extremely large interstice volume.

Filtration of the raw water through the filter according to the first embodiment of this invention can be conducted in the following manner.

The valves 9,13 are opened, and the raw water containing suspended solids is fed as a downflow by way of the raw water feed line 4.

By the stream of the raw water, the bundled long fibers 3 are somewhat bent at lower portions thereof and are reduced in height at an initial stage as shown in FIG. 1. The bundled long fibers 3 however remain upright as a whole within the shell 1, so that the raw water passes as a downflow from upper end portions of the bundled upright long fibers 3 toward their lower end portions. Suspended solids are thus trapped in interstices 40 between the bundled long fibers 3, whereby filtered water is withdrawn through a filtered water outlet line 6.

Since the bundled long fibers 3 are somewhat bent or collapsed at lower parts thereof by the stream of the downflow, the lower parts of the long fibers 3 are packed at a somewhat higher density than their upper parts which extend vertically. As a result, no channeling of the raw water occurs so that the solids suspended in the raw water can be effectively trapped by the bundled long fibers. Where the solids suspended in the raw water are fine solid particles, a coagulant such as polyaluminum chloride, aluminum sulfate or a cationic, anionic or nonionic high molecular-weight material may be added as a filter aid to the raw water.

Figure 2:
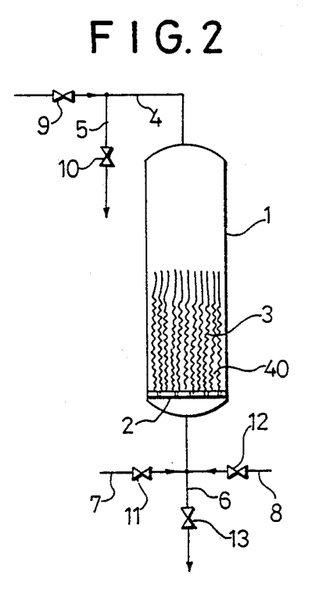
FIG. 2 is a simplified vertical cross-section of the column filter in a final stage of filtration.

As the feeding of the raw water is continued, more and more suspended solids are trapped as they are and/or as coagulated coarser solids in interstices between the long fibers in the bundles so that the pressure drop due to filtration resistance increases gradually. Along with the increase of the pressure drop, the extent of bending or collapse of the bundled long fibers at the lower parts thereof increases so that the vertical length of the bundled long fibers decreases little by little as depicted in FIG. 2. However, this bending or collapse does not advance to upper end portions of the bundled long fibers, and even at the end of the feeding of the raw water the upper end portions of the bundled long fibers are still extending vertically.

The feeding of the raw water is continued in the above manner until the pressure drop reaches a predetermined value or the quality of the filtered water falls to a prescribed level. Backwashing is then carried out in the following manner.

Figure 3:
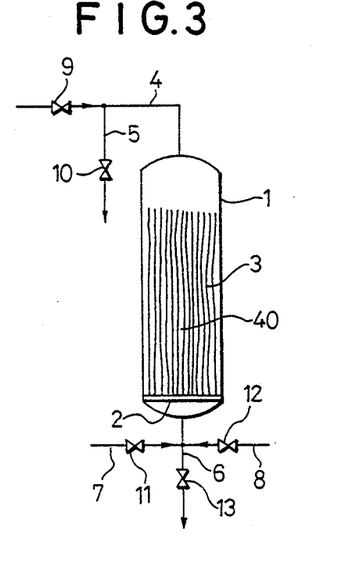
FIG. 3 is a simplified vertical cross-section of the column filter under backwashing.

The valves 9,13 are closed, and the valves 10,12 are opened to allow compressed air to flow in through the air feed line 8.

By the inflow of the compressed air, the water inside the shell 1 is agitated and at the same time the bundled long fibers are shaken. The interstices which have been defined between the fibers in the bundles are thus broken up, so that the solids and/or solid aggregates trapped in the interstices are disintegrated and the solids and/or solid aggregates deposited on the bundled long fibers are separated.

While continuously feeding the compressed air or after closing the valve 12 to stop the inflow of the compressed air, the valve 11 is opened with the valve 10 maintained open. This allows backwash water to flow into the shell 1 via the backwash water feed line 7.

Since the bundled long fibers 3 are fixed at the lower end portions thereof on the perforated plate 2 but are free-standing at the upper end portions thereof, the upflow of the backwash water flowed into the shell 1 causes the bundled long fibers 3 to extend as a streamer and also to shake with the lower end portions thereof fixed on the perforated plate 2 as illustrated in FIG. 3.

The trapped solids are hence no longer allowed to remain among and on the bundled long fibers. The solids are hence released from the bundled long fibers and a backwash effluent containing a great deal of solids suspended therein is discharged through the backwash water discharge line 5.

In addition to the above-mentioned backwashing method, the backwashing of the column filter according to the first embodiment of this invention can also be performed by feeding compressed air intermittently while feeding backwash water as an upflow at a constant rate. In fact, this backwashing method is more effective in many instances.

Because the lower end portions of the bundled long fibers 3 are fixed on the perforated plate in the column filter according to the first embodiment of this invention, the bundled long fibers 3 are not washed out of the shell 1 even when backwash water and/or compressed air are fed at a high flow velocity.

Compared to conventional filters using a filter medium such as sand or anthracite, the column filter according to the first embodiment of this invention allows to feed backwash water and/or compressed air at a higher flow velocity. Further, absolutely no flow obstacle such as a screen is provided in a top part of the shell. Therefore, the column filter according to the first embodiment of this invention can flush out trapped solids in a shorter time and effectively.

Where the upright cylindrical shell 1 has a relatively large diameter, it is desirable to provide one or more upright partition walls substantially in parallel with the bundled long fibers 3 within the shell 1 to divide the interior of the shell 1 into vertically-extending sections so that the bundled long fibers 3 may be prevented from being bent horizontally or obliquely during the feeding of the raw water.

A description will next be made of the bundled long fibers 3 useful in the practice of this invention.

As already described above, the bundled long fibers 3 useful in this invention are somewhat bent or collapsed at lower parts thereof and are reduced in height at an initial stage even when a raw water of a relatively high flow velocity is fed as a downflow, and upon continuation of the feeding of the raw water, the lower parts of the bundled longer fibers 3 are progressively bent further and their height is reduced little by little. The bundled long fibers 3 are thus required to have stiffness and packing quantity or density sufficient to prevent their horizontal bending and to allow them to remain upright as a whole in the upright cylindrical shell 1 during the feeding of the raw water. Usable fibers include synthetic fibers such as acrylic fibers, polyester fibers and polyamide fibers as well as natural fibers such as cotton and wool.

As these synthetic fibers or natural fibers, it is preferable to use units of non-twisted monofilaments having a diameter not greater than 80 $\mu$m, usually around 35 $\mu$m or so.

However, units of twisted filaments may also be used so long as they take the form of bundled long fibers which are not bent horizontally and remain upright as a whole in the upright cylindrical shell 1 while the raw water is passed.

As the packing density of the long fibers in the bundles employed in this invention becomes higher, finer suspended solids can be removed to provide filtered water of higher quality. However, the pressure drop increases.

On the other hand, the quality of filtered water falls as the packing density of the long fibers becomes lower. In contrast, the pressure drop decreases.

It is accordingly desirable to choose bundles of long fibers having a most suitable packing density depending on the nature or concentration of solids suspended in the raw water. When bundles of long fibers composed of units of non-twisted monofilaments 1,000–3,000 nm long are used by way of example, it is preferable to pack bundles to give a packing density of 25–110 kg in terms of their dry weight per bulk volume m$^3$ of the bundles.

The length of the bundled long fibers may be limited to the range exceeding 1,000 mm—especially longer than 2,000 mm—but shorter than 3,000 mm in this invention. This is for the following reasons.

If the length of the bundled long fibers is 1,000 mm or shorter, the filtration time is so short that the column filter is not satisfactory as an industrial apparatus. Although the filtration time becomes longer as the length of the bundled long fibers increases, the filtration time reaches to saturation at the length exceeding about 3,000 mm. Then, the advantages available from the use of bundled fibers having a greater length are reduced and the use of bundled fibers of such a greater length results merely in a higher manufacturing cost. It is therefore not preferable to use bundled fibers having a length outside the above range. In other words, marked advantages in filtration time can be brought about where the bundled long fibers have a length in the range of 1,000–3,000 mm.

The quality of filtered water is somewhat inferior where the length of the bundled long fibers is 1,000 mm or less. There is however no significant difference in the filtered water quality among the bundled fibers length range greater than 1,000 mm but shorter than 3,000 mm.

Figure 4:
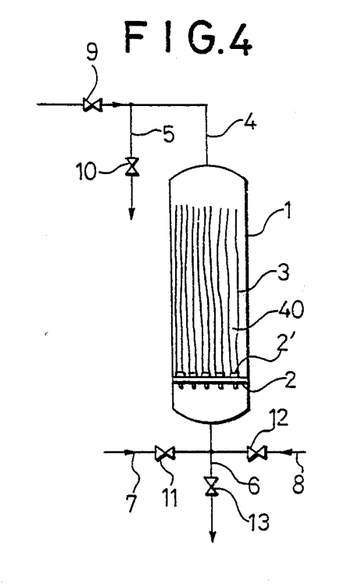
FIG. 4 is a vertical cross-section showing the overall construction of the column filter according to the first embodiment of this invention, in which some modifications have been incorporated.

The column filter according to the first embodiment of this invention, in which some modifications have been incorporated, is illustrated in FIG. 4. The perforated plate 2 is arranged transversely in the lower part of the upright cylindrical shell 1. Holders 2' for bundles of long fibers, which will be described subsequently, are attached to the perforated plate 2. The bundled long fibers 3 are fixed at lower end portions thereof by the holders 2' but are free-standing at upper end portions thereof. The bundled long fibers 3 are packed at a relatively high density within the shell 1, so that the bundled long fibers 3 extend upright in the shell 1.

The raw water feed line 4 is provided in communication with the top part of the shell 1, and the backwash water discharge line 5 is communicated as a branch to the raw water feed line 4.

A filtered water outlet line 6 is provided in communication with a bottom part of the shell 1. A backwash air feed line 8 is provided as a branch in communication with the water outlet line 6. A backwash water feed line 7 is also communicated as a branch to the outlet line 6.

In this modified embodiment, the backwash air feed line 8 may be bifurcated to communicate with the shell 1 at antipodal points on the side wall of the shell 1. A single backwash air feed line may certainly be used without problems Numerals 9, 10, 11, 12 and 13 indicate valves, respectively.

A description will next be made of the holders 2' which are used for the bundled long fibers in the column filter of this invention.

Figures 5, 6:
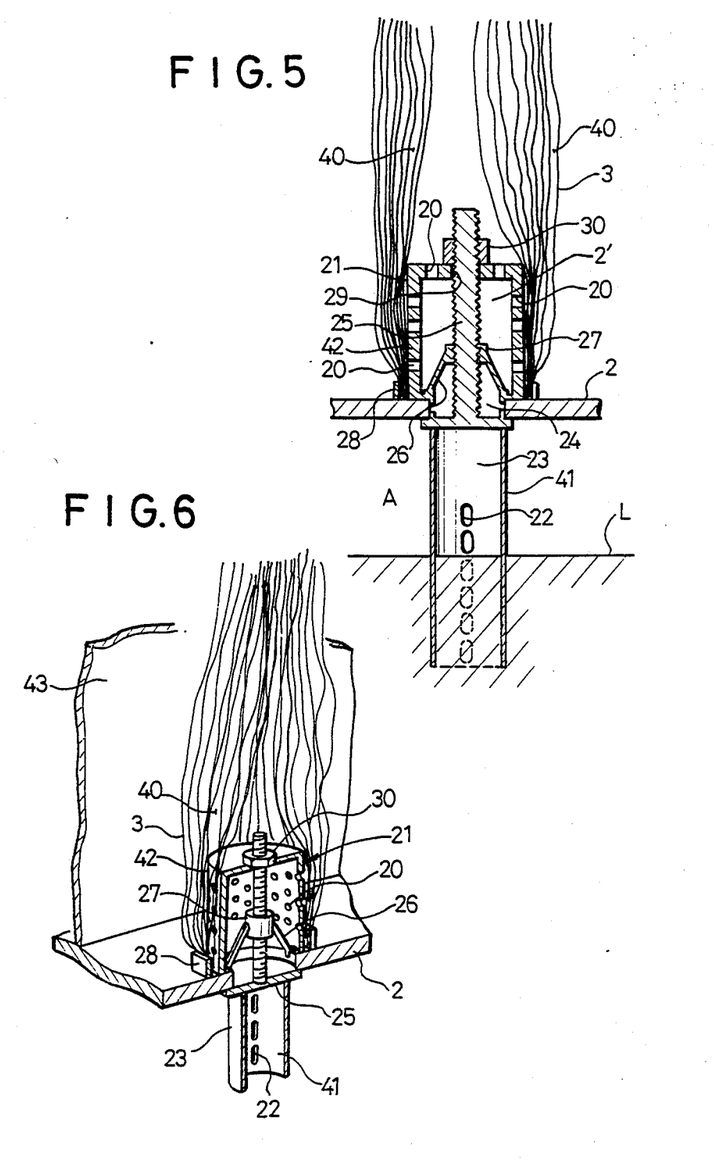
FIG. 5 is an enlarged vertical cross-section of each holder for bundles of long fibers, said holder being used in the column filter of FIG. 4.
FIG. 6 is a partly cut-away perspective view of the holder of FIG. 5.

The holders 2' constitute the most important feature in this invention. As illustrated in FIGS. 5 and 6 by way of example, each of the holders 2' is formed basically of a cap 21 as an upper cap member, said cap defining many circular orifices 20 trough its top wall and its side wall 42, and a tube 23 as a lower hollow member, said tube defining as axially-elongated openings slits 22 through a side wall 41 thereof and opening at both upper and lower ends thereof.

Attachment of each holders 2' to its corresponding perforation 24 of the perforated plate 2 is performed in the following manner.

First of all, a pair of holes (not shown) are bored in an antipodal relation through the side wall 41 of the tube 23 at points adjacent the upper end of the tube 23. The T-shaped head of a T-bolt 25 is inserted into the holes so that the tube 23 is suspended from the T-bolt 25. Incidentally, the outer diameter of the tube 23 is slightly smaller than the diameter of the perforation 24 of the perforated plate 2 so that an upper end portion of the tube 23 may be closely fitted in the the perforation 24.

Thereafter, the stem of the T-bolt 25 is inserted upwardly through the perforation 24 until the upper end portion of the tube 23 is fitted in the perforation 24. A nut 27 with legs 26 is then applied on the T-bolt 25 to hold the T-bolt 25 in the perforation 24 by the legs 26.

The cap 21 with the bundled long fibers 3 fixed at their low end portions on the entire peripheral side wall 42 by a band 28 is then placed over the perforation 24 with the stem of the T-bolt 25 extending through a hole 29 of the cap 21. A nut 30 is next applied on the T-bolt 25 so that the cap 21 is fixed over the perforation 24.

In a manner as described above, the holders 2' for the bundled long fiber are attached to the respective perforations 24 of the perforated plate 2.

Incidentally, the orifices 20 of the cap 21 permit the passage of fluids such as filtered water, compressed air and backwash water therethrough. It should however be noted that the formation of the orifices 20 in the top wall of the cap 21 is not essential. It is however necessary to form many orifices through the entire peripheral side wall 42 of the cap 21. The circular orifices 20 may be replaced by slits.

The slit 22 of the tube 23 primarily serves to permits passage of compressed air therethrough. The slit 22 may be replaced by a plurality of small holes arranged vertically.

The structure of the holders 2' for bundled long fibers and the manner of their attachment shown in FIGS. 5 and 6 are merely illustrative. Their detailed structures may be modified as desired, provided that described basically, the holders 2' for bundled long fibers, each of said holders 2' being composed of the cap 21 defining many orifices 20 or slits through the entire peripheral side wall 41 thereof and the tube 23 defining a slit 22 or vertically-arranged small holes through the side wall 41 thereof and opening at both upper and lower ends thereof, are attached to the respective perforations 24 of the perforated plate 2 arranged transversely within the shell 1 with the cap 21 being located above the perforated plate 2 and the tube 23 being positioned below the perforated plate 2; and the lower end portions of the bundled long fibers 3 are fixed to lower peripheries of the side walls 42 of the associated caps 21.

Where the upright cylindrical shell 1 has a relatively large diameter, it is desirable, as shown in FIG. 6, to provide one or more upright partition walls 43 substantially in parallel with the bundled long fibers 3 within the shell 1 to divide the interior of the shell 1 into vertically-extending sections so that the bundled long fibers 3 may be prevented from being bent horizontally or obliquely during the feeding of the raw water.

Figure 9:
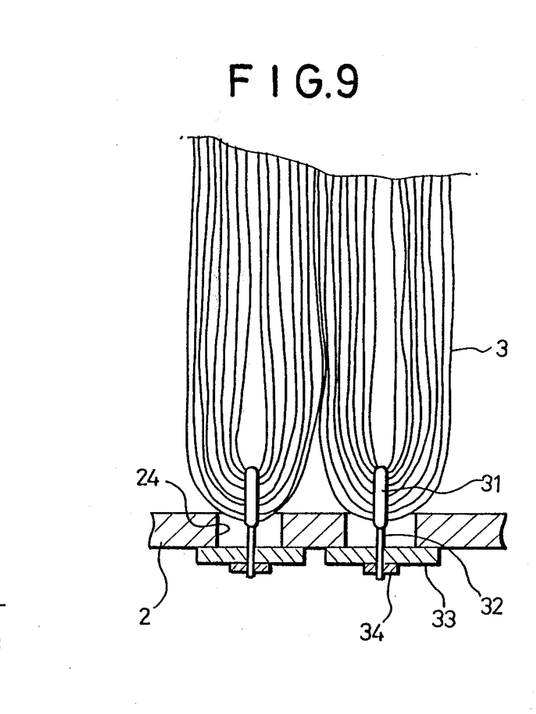
FIG. 9 is an enlarged fragmentary vertical cross-section illustrating the construction of a lower part of the conventional column filter of FIG. 8.

Before the present invention, the fixing of lower end portions of bundled long fibers was conducted as shown in FIG. 9. Each bundle of long fibers 3 was folded and bound at the folded part by a ring 31. The folded part was positioned to close up each perforation 24 of the perforated plate 2. Using a bolt 32 connected to the ring 31, the bundle of long fibers 3 was fixed with a stem-like holder 33 and a nut 34. The conventional fixing method was therefore accompanied by drawbacks to be described next.

In such a structure, the long fibers bundled together at the ring 31 were arranged very densely and a raw water always had to pass through the densely-bundled part of the long fibers during the filtration. The densely-bundled part of the long fibers was therefore prone to clogging with suspended solids. Once the densely-bundled part was clogged, it was difficult to remove the thus-trapped solids even when backwashing was conducted.

Because, when a fluid such as compressed air or backwash water is caused to pass upwardly through each perforation 24 in such a structure as depicted in FIG. 9, the fluid passes preferentially through the point of contact between the upper surface of the perforated plate 2 and the bundled long fibers 3 and hardly passes through the fiber part through which the fluid is supposed to pass, namely, the densely-bundled part of the long fibers. When the nut 34 is tightened firmly to increase the degree of contact between each bundle of long fibers 3 and the edge of its corresponding perforation 24, the fluid preferentially passes through the perforations 24 having bundles of long fibers 3 less clogged with trapped solids. The fluid therefore does not pass through the bundles of long fibers which require washing, namely, through the perforations 24 having bundles of long fibers 3 whose densely-bundled parts are clogged with trapped solids.

When the filter is operated continuously under the above conditions, more solids gradually remain in the densely-bundled part of each bundled long fibers. This causes the initial pressure drop to increase gradually in the life of column filter, and in some instances gives serious problems to the filtration plant itself.

As another drawback, even when the bundle of long fibers 3 is so fixed as to squeeze itself in the corresponding perforation 24, a small clearance still remains between the peripheral edge of the perforation 24 and the bundles of long fibers 3. An increased pressure drop causes suspended solids to leak through the clearance, so that the quality of the filtered water falls toward the end of filtration.

In a column filter operation of the present invention, as the filtration proceeds and more solids are trapped in the interstices among the long fibers 3 in the bundles, the pressure drop increases gradually As the pressure drop increases, the vertically-extending long fibers in the bundles begin to be bent from the lower end portions thereof so that their vertical length decreases gradually.

When the increase of the pressure drop has reached a predetermined value, backwashing is conducted in the following manner.

Referring again FIGS. 4 to 6, the valves 9,13 are closed to stop the filtration and the valves 10,12 are then opened to feed compressed air through the backwash air feed line 8. Since the bottom part underneath the perforated plate 2 is filled with the filtered water, the inflow of the compressed air firstly causes the filtered water to flow out through the individual orifices 20 of each cap 21. However, a water level L is soon formed below the perforated plate 2 as depicted in FIG. 5. A layer A of the compressed air is therefore formed above the water level L. The compressed air therefore enters the tube 23 through a portion of the slit 22, said portion being located above the water level L, and then blows out through the individual orifices 20 of each cap 21.

By the blow-out of the compressed air, the water inside the upright cylindrical shell 1 is agitated and the bundled long fibers 3 are shaken. The interstices which have been formed among the fibers 3 are hence broken up to disintegrate solids trapped and accumulated therein. In addition, solids deposited on the bundled long fibers 3 are also shaken off.

In particular, the water which is contained underneath the perforated plate 2 at the beginning of feeding of the compressed air is lifted at once by the compressed air and jets out as high-velocity plug flows through the individual orifices 20 of each cap 21, followed by the flow-out of the compressed air. The densely-bundled part of the bundled long fibers 3 located around each cap 21 can therefore be washed effectively by the passage of the fluids therethrough.

While continuing the above-described inflow of the compressed air or after closing the valve 12 to stop the feeding of the compressed air, the valve 11 is opened to feed backwash water through the backwash water feed line 7.

The backwash water thus fed enters primarily through the lower opening of each tube 23 and flows out through the individual orifices 20 of each cap 21.

Since the bundled long fibers 3 are fixed at the lower end portions thereof and are free-standing at the upper end portions thereof, the bundled long fibers 3 are caused to extend and are shaken like a streamer by the upflow of the backwash water.

The solids released from the bundled long fibers 3 by the impact of the inflow of the compressed air are hence flushed by the backwash water, so that the backwash water containing a great deal of solids suspended therein is discharged through the backwash water discharge line 5.

Different from the backwashing method described above, the backwashing can also be performed by feeding compressed air intermittently through the backwash air feed line 8 while feeding backwash water at a constant rate through the backwash water feed line 7.

Figure 7:
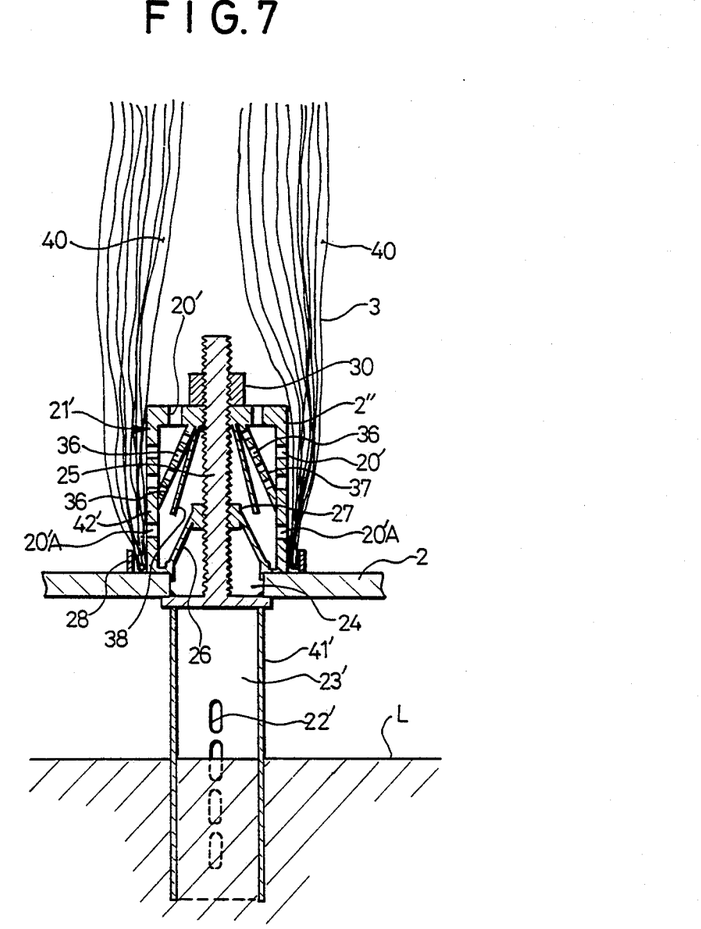
FIG. 7 is similar to FIG. 5 but shows a modified holder.
Figure 8:
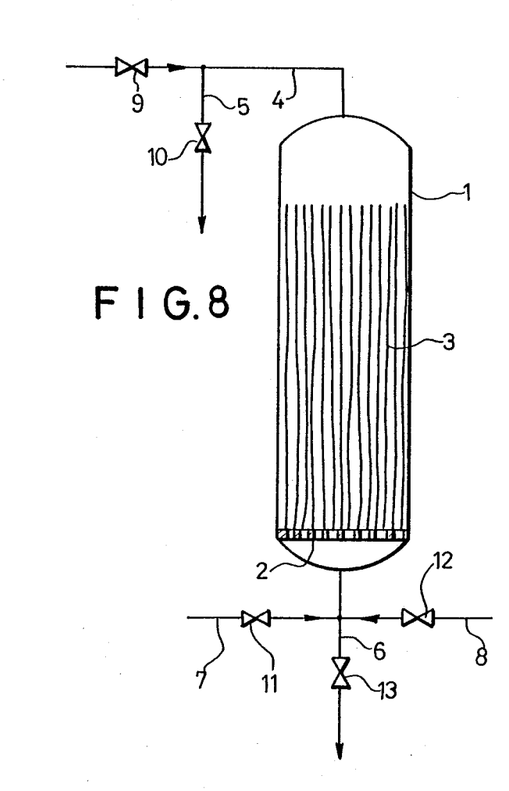
FIG. 8 is a flow diagram of a conventional column filter using bundles of long fibers.

In this case, high-velocity plug flows are formed as described above whenever the compressed air is fed so that more effective backwashing is feasible Another embodiment of the supports for bundles of long fibers, which are employed in this invention, is illustrated in FIG. 7. A conical diaphragm seat 37 defining many through-perforations 36 is provided in an upper interior part of each cap 21'. Provided inside the diaphragm seat 37 is a conical diaphragm 38 which can close up the through-perforations 36 when brought into close contact with the inner surface of the diaphragm seat 37. Slits 20' are formed through a top wall of the cap 21' and also through its side wall 42'. Through a side wall 41' of a tube 23', a plurality of small slit 22' are spacedly formed in an axial, namely, vertical row. The remaining structure is similar to the holder shown in FIG. 5. An upper end portion of the diaphragm 38 is secured on the inner surface of the top wall of the cap 21, while its lower end portion flares out in the form of a horn. It is made of a flexible material.

The diaphragm seat 37 and diaphragm 38 function as follows.

During the filtration, the filtered water passes downwardly through the slits 20' and the diaphragm 38 is pushed inwardly by the filtered water. Therefore, the diaphragm seat 37 and diaphragm 38 neither exhibit any function nor interfere with the filtration.

However, they function in the following manner during backwashing.

By an upflow of compressed air or backwash water fed through the tube 23', the diaphragm 38 is outwardly pushed and opened so that the diaphragm 38 is brought into close contact with the inner surface of the diaphragm seat 37. As a result, the compressed air or backwash water is allowed to pass only through the slits 20'A formed below the diaphragm seat 37.

Accordingly, the compressed air or backwash water is allowed to flow out preferentially through the lower end portion of the fixed part of the bundled long fibers 3, so that the hardly-washable lower end portions of the bundled long fibers 3 can be washed effectively. The construction of FIG. 7 is particularly effective for ensuring the flushing of trapped solids from the bundled long fibers during backwashing.

To demonstrate the advantages of the present invention, the present invention will hereinafter be described specifically by the following example. Example:

A perforated plate was arranged in a lower part of an upright cylindrical shell made of stainless steel. At a straight wall portion of the shell, the diameter and height were 650 mm and 4,000 mm, respectively. Seven bundles of long fibers composed of units of non-twisted acrylic monofilaments having a diameter of 35 $\mu$m, whose lengths ranged from 800 mm to 3,500 mm, were separately fixed at lower end portions thereof but left free-standing at upper end portions thereof, so that filters as illustrated in FIGS. 4 to 6 were constructed, respectively.

The end point of feeding of a raw water was set at 0.5 kg/cm$^2$ in terms of pressure drop (initial pressure drop: 0.1 kg/cm$^2$). After the end of the feeding of the raw water through each filter, the filter was backwashed first with air having a linear upflow velocity of 1,000 Nm$^3$/m$^2$ for 1 minute, with 1,000 Nm$^3$/m$^2$ of air and 100 m/hr of backwash water for 3 minutes, and then with 100 m/hr of backwash water alone for 1 minute. The pressure drop through the packed medium layer was reduced to the initial pressure drop, thereby indicating that the solids trapped by the bundled long fibers had been flushed completely and the the conditions before the filtration had been restored.

The above experimental filtration was conducted for 6 months. The filtration times and the average turbidities of treated waters for the respective lengths of the bundled long fibers were as shown in the following table.

| Length of bundled long fibers, m | Filtration time, hr | Average turbidity of treated water, degree |
| --- | --- | --- |
| 0.8 | 4 | 11 |
| 1.0 | 5.3 | 8 |
| 1.5 | 8 | 7 |
| 2.0 | 10 | 7 |
| 2.5 | 12 | 7 |
| 3.0 | 13 | 7 |
| 3.5 | 13.5 | 7 |

We claim:

1. In a column filter comprising an upright cylindrical shell and bundles of long fibers arranged substantially upright inside the shell with the lower end portions thereof being fixed and the upper end portions thereof being free-standing, whereby, when a raw liquid with suspended solids therein is fed to a top part of the shell and is then allowed to pass from the upper end portions of the bundles of long fibers toward their lower end portions, the suspended solids are at least partly trapped in interstices among the fibers, the improvement which comprises: a plurality of holders for the respective bundles of fibers, each of said holders being formed of an upper cap member and a lower hollow member communicating with each other, said upper cap member defining openings therethrough and said lower hollow member defining at least an axially-elongated opening through a side wall thereof and opening at both upper and lower ends thereof, a perforated plate arranged transversely in a lower interior part of the shell, said holders being mounted on said perforated plate with the upper cap member being located above the perforated plate and the lower hollow member being positioned below the perforated plate; the holders covering substantially all the perforations of the perforated plate;

and means for fixing the lower end portion of each of the bundles of long fibers to a lower periphery of a side wall of the associated upper cap member for flowing a backwashing fluid through said lower hollow cap member and thence through said openings in said upper cap member to dislodge solids that are trapped in the interstices among the fibers sufficient to cause the column filter to be backwashed completely in a short time.

2. The column filter as claimed in claim 1, wherein the openings of the upper cap member are holes.

3. The column filter as claimed in claim 1, wherein the openings of the upper cap member are slits.

4. The column filter as claimed in claim 1, wherein the axially-elongated opening of the lower hollow member is a slit.

5. The column filter as claimed in claim 1, wherein the axially-elongated opening of the lower hollow member comprises a plurality of small holes.

6. The column filter as claimed in claim 1, wherein the holders cover all the perforations of the perforated plate, respectively.

7. The column filter as claimed in claim 1, wherein the long fibers in the bundles are longer than 1,000 mm but shorter than 3,000 mm.

8. The column filter as claimed in claim 7, wherein the long fibers in the bundles are longer than 2,000 mm but shorter than 3,000 mm.

9. The column filter as claimed in claim 7, wherein the packing density of the bundles of long fibers is 25-110 kg in terms of their dry weight per bulk volume $m^3$ of the bundles.

10. The column filter as claimed in claim 1, wherein the upper cap member is cylindrical.

11. The column filter as claimed in claim 10, wherein the openings formed through the upper cap member are distributed over the side wall of the upper cap member.

12. The column filter as claimed in claim 10, wherein a conical diaphragm seat defining through-perforations therethrough is provided at an inner upper part of the upper cap member and a conical diaphragm is arranged inside the conical diaphragm seat to close up the through-perforations when brought into close contact with an inner surface of the conical diaphragm seat.

13. The column filter as claimed in claim 1, wherein the lower hollow member is tubular.

14. The column filter as claimed in claim 1, wherein at least one upright partition wall is additionally provided substantially in parallel with the bundles of long fibers within the shell whereby the interior of the shell is divided into vertically-extending sections.

15. The column filter as claimed in claim 1, wherein the bundles of long fibers have each been obtained by bundling units of non-twisted monofilaments having a diameter not greater than 80 $\mu$m.

* * * * *